(12) United States Patent
Weger et al.

(10) Patent No.: US 10,005,539 B2
(45) Date of Patent: Jun. 26, 2018

(54) INTERIOR TRIM PART AND SET OF PREFABRICATED PARTS FOR AN AIRCRAFT CELL

(71) Applicant: Helikopter Air Transport GmbH, Vienna (AT)

(72) Inventors: Martin Weger, Fulpmes (AT); Wolfgang Burger, Zams (AT)

(73) Assignee: Helikopter Air Transport GmbH, Vienna (AT)

( * ) Notice: Subject to any disclaimer, the term of this patent is extended or adjusted under 35 U.S.C. 154(b) by 232 days.

(21) Appl. No.: 15/038,421

(22) PCT Filed: Nov. 20, 2014

(86) PCT No.: PCT/AT2014/050278
§ 371 (c)(1),
(2) Date: Jul. 18, 2016

(87) PCT Pub. No.: WO2015/074090
PCT Pub. Date: May 28, 2015

(65) Prior Publication Data
US 2016/0362170 A1 Dec. 15, 2016

(30) Foreign Application Priority Data
Nov. 20, 2013 (AT) ................. A 899/2013

(51) Int. Cl.
*B64C 1/18* (2006.01)
*B64C 1/06* (2006.01)
*B64C 1/12* (2006.01)
*B64D 11/00* (2006.01)

(52) U.S. Cl.
CPC ................ *B64C 1/18* (2013.01); *B64C 1/066* (2013.01); *B64C 1/12* (2013.01); *B64D 2011/0046* (2013.01); *Y02T 50/46* (2013.01)

(58) Field of Classification Search
CPC .. B64C 1/18; B64C 1/12; B64C 1/066; Y02T 50/46; B64D 2011/0046
See application file for complete search history.

(56) References Cited

U.S. PATENT DOCUMENTS

| 2,391,051 A | 12/1945 | Windsor |
| 5,083,727 A | 1/1992 | Pompei et al. |
| 5,108,048 A | 4/1992 | Chang |
| 5,178,346 A | 1/1993 | Beroth |
| 9,700,995 B2 * | 7/2017 | Hoetzeldt ............... B25B 11/00 |
| 9,764,845 B2 * | 9/2017 | Hoetzeldt .............. B64D 13/02 |

(Continued)

FOREIGN PATENT DOCUMENTS

| DE | 102004001080 A1 | 8/2005 |
| DE | 102006048376 A1 | 4/2008 |

(Continued)

*Primary Examiner* — Valentina Xavier
(74) *Attorney, Agent, or Firm* — FisherBroyles, LLP

(57) ABSTRACT

The invention relates to an interior trim part (2, 3, 4, 5, 6) for the planar installation with similar interior trim parts for producing a wall covering inside an aircraft cell, wherein the interior trim part (2, 3, 4, 5, 6) can be rigidly connected to the aircraft cell. The interior trim part has a support structure (20, 21, 22, 23), wherein at least one holding position (9) is provided, which is designed to bear a load in the interior.

20 Claims, 10 Drawing Sheets

(56) References Cited

U.S. PATENT DOCUMENTS

| | | | |
|---|---|---|---|
| 2009/0026318 A1* | 1/2009 | Gross | B64D 11/003 244/131 |
| 2012/0145828 A1 | 6/2012 | Grosse-Plankermann et al. | |
| 2013/0087656 A1* | 4/2013 | Hoetzeldt | B64C 1/066 244/119 |
| 2018/0016010 A1* | 1/2018 | Benthien | B64D 11/00 |

FOREIGN PATENT DOCUMENTS

| DE | 102008026116 A1 | 12/2009 |
|---|---|---|
| DE | 102008039651 A1 | 2/2010 |

\* cited by examiner

INTERIOR TRIM PART AND SET OF PREFABRICATED PARTS FOR AN AIRCRAFT CELL

The invention relates to an interior trim part for planar installation with similar interior trim parts for producing a wall covering inside an aircraft cell, wherein the interior trim part can be rigidly connected to the aircraft cell.

In aircraft construction, it is necessary to provide an interior trim inside the aircraft cell for various reasons. In addition, in ambulance aircrafts and rescue helicopters in particular, there is a need for a hygienic environment protected from external influences for the transfer of patients.

The interior trim panels previously used essentially serve to form a smooth closed surface to provide the cover of the aircraft interior and are not designed for the suspension of heavy loads. In the case of an ambulance aircraft or a rescue helicopter, various pieces of equipment like measuring and supply devices for the resuscitation and stabilization of patients need to be suspended from the sides for lack of space, which is why a special bearing construction with side walls, a ceiling wall and a solid floor wall needs to be provided, with the construction being formed immediately adjacent to the interior trim for lack of space.

In this way, the available interior space is reduced, and the weight of the aircraft is increased.

The aim of the present invention is to provide an interior trim part and a set of prefabricated parts which allow achieving both a better use of space and a reduced weight load.

According to the invention, this is achieved for an interior trim part of the above-mentioned type by its having a support structure, wherein at least one holding position designed for receiving a load on the interior side is provided.

Thus, the interior trim part according to the invention is formed such as to be directly attachable to the aircraft cell and, at the same time, to be reinforced such as to be able to receive load forces, for which purpose predefined holding positions are provided at predefined interior trim part positions, at which the load forces may be transmitted into the interior trim part according to the invention, e.g. in the form of subsections reinforced for this purpose, in which threads, hooks, eyes or similar attachment points are available.

In this way, an additional support construction may be omitted, and space may be saved accordingly. Thereby, the space available in the cross-section of the aircraft cell is increased as opposed to conventional solutions.

Since the holding positions are incorporated as early as in the manufacture of the interior trim parts, no changes can be made to the position of the holding positions after the installation of the interior trim parts in an aircraft cell unless the respective interior trim part is replaced.

However, in order to allow for a subsequent change of the holding positions, according to a further embodiment of the invention the interior trim parts may have a plurality of selectable holding positions in a grid-like arrangement beneath the surface, whereby a variable attachment of equipment devices, especially medical ones, is achieved.

One possible form of implementation may require that the holding positions are formed by covered treaded inserts, which are integrated into the interior trim parts, with the treaded inserts being designed to receive holding devices. The threaded inserts are "activated" only when needed. Threaded inserts that are no longer needed may be reclosed to again to achieve a smooth surface.

Another exemplary embodiment of the invention may require that the interior trim parts have reinforcements or ribbings, which may be formed in a known manner at predefined positions to increase rigidity.

According to a further development of the invention, the support structure may be formed by an embedded lattice having lattice nodes and lattice ridges, wherein the holding positions are formed at the lattice nodes, and the lattice, the lattice nodes and the lattice ridges may preferably be formed from a carbon fiber material. In this way, the individual holding positions are in connection with one another, and the transmission of the acting forces into the aircraft cell is improved accordingly.

Another embodiment of the invention may require that the lattice nodes are formed by cylindrical receiving members having bores into which treaded inserts may be introduced.

In this way, the receiving members for the threaded inserts may be concealed inside the interior trim part according to the invention and may then be selected as required to introduce a threaded insert, by means of which a load may be held by a threaded connection on the interior side.

According to another form of the invention, the interior trim part may comprise a honeycomb-shaped material of aramid fibers and phenolic resin, preferably in the form of prepreg members, in which the lattice is embedded and which is accommodated between cover layers. Due to the connection between the lattice and the cover layers provided by the cured fiber/resin layering, highly effective composite action may be achieved.

The holding positions may be covered by the cover layers and thus not be visible from the outside, while insert position markings on the interior-side cover layer may mark the underlying lattice nodes.

Furthermore, embedded attachment inserts, which are force-locked to the embedded lattice and in this way allow for an effective force-locked connection to the body of the aircraft, may be provided in the interior trim part according to the invention.

According to another exemplary embodiment of the invention, the attachment insert may have a through-hole, which extends from the inner side to the outer side of the interior trim part and through which an attachment screw may be inserted, by means of which a force-locked connection may be established to the aircraft cell, e.g. by means of an attachment socket attached thereto, or to another interior trim part.

In this context it may be advantageous to have each attachment insert connected to the lattice, preferably to one of the lattice nodes, by means of a ridge.

Furthermore, the invention relates to a set of prefabricated parts having one more interior trim parts according to the invention.

In order to achieve the above-mentioned objectives of the invention, in a set of prefabricated parts with two or more interior trim parts as described above, it may be provided that the interior trim parts have connection points at which they may be force-locked to one another.

In this way, composite action and thus an increased load-bearing capacity are achieved.

Furthermore, the interior trim parts may have embedded attachment inserts, by means of which they may be connected to the aircraft cell for force transmission.

According to another aspect of the invention, the interior trim parts may have fixing brackets for connection to and force transmission into the aircraft cell, whereby the loads acting on the interior trim parts may be distributed by means of the bearing members of the aircraft cell.

In particular, the interior trim parts may be connected or threadably connected to the aircraft cell by means of the fixing brackets.

According to a variant of the invention, the interior trim parts may have at least two side parts and one ceiling part, which are connectable in such a way as to form a U-shaped cross-section. In this way, a highly composite may be achieved.

In another form of the invention it may be provided that the interior trim parts have a plurality of selectable holding positions in a grid-like arrangement beneath the surface to allow for a variable attachment of equipment devices, especially medical ones.

According to another embodiment, parts of the standard interior trims may be replaced with bearing interior trim parts according to the invention, which are in turn designed such as to have at least one or more holding positions to receive a load.

Due to the high rigidity of the set according to the invention, which is achieved by the connection between the interior trim parts, a floor plate which has a reduced wall thickness and is not force-locked to the interior trim parts may be attached in the floor section of the aircraft cell.

According to another embodiment of the invention, the floor plate may have holders, e.g. for a stretcher, and provides protection to the original floor of the aircraft.

Furthermore, the invention relates to an aircraft with a set of prefabricated parts according to the invention that are attached in the aircraft cell, with the aircraft being e.g. a helicopter, especially a rescue or medical helicopter, or an airplane which has the possibility of integrating flexibly required tools into the cabin.

Hereinafter, the invention will be described with reference to the exemplary embodiment described in the drawings. In these, FIGS. 1 and 2 show perspective views of one embodiment of the set of parts according to the invention, which is assembled from interior trim parts according to the invention;

Figure 3:
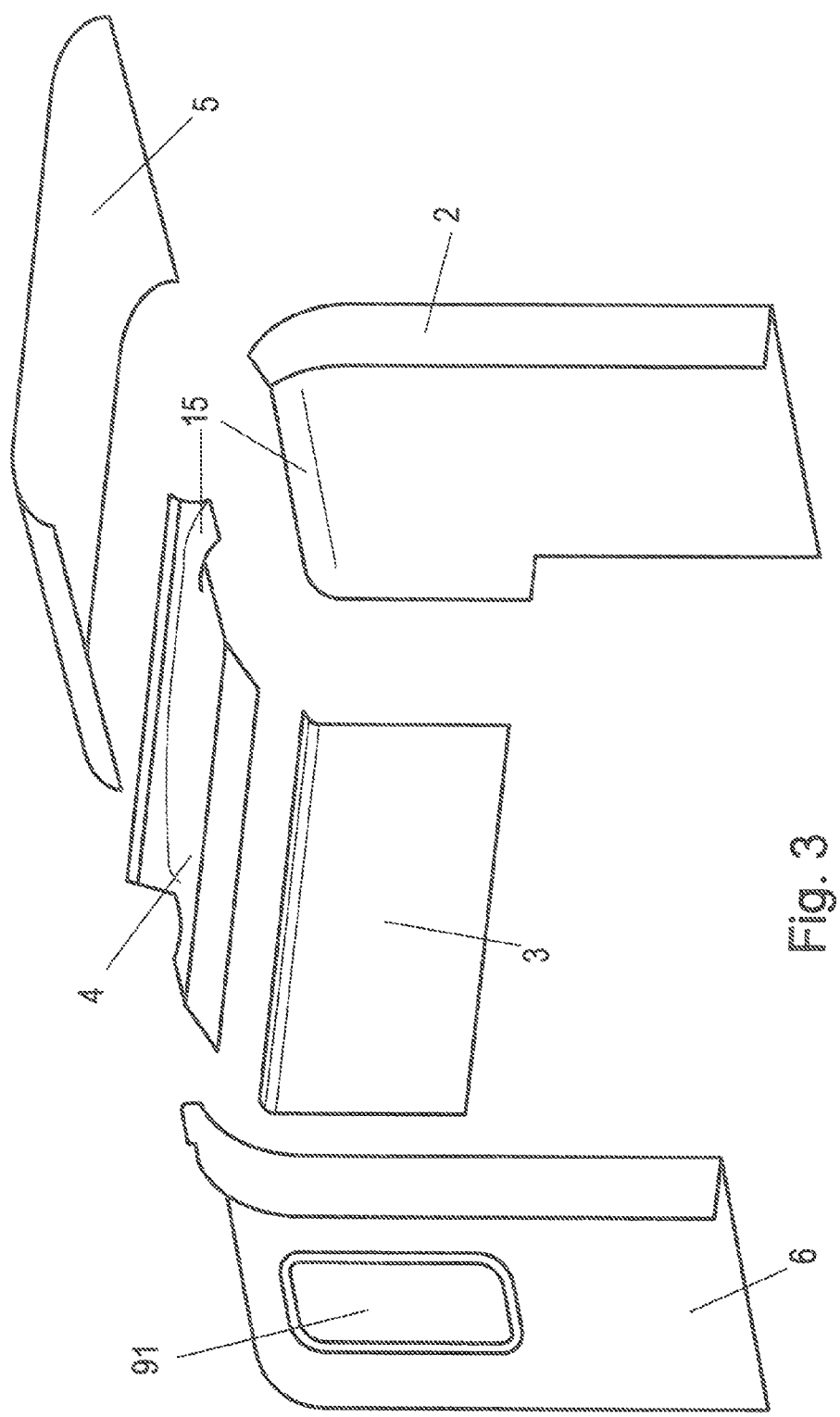
FIG. 3 shows the set of parts according to FIGS. 1 and 2 in an explosive view.

FIG. 3 shows a set of prefabricated parts 1 according to the invention prior to installation, which has interior trim parts 2, 3, 4, 5 which are of various shapes with recesses, protrusions, passages etc. to adjust them to the shape of an aircraft cell as defined by windows, doors etc. and are formed such as to have a closed surface. For example, through holes 91 are adjusted to fit the windows of the respective aircraft cell. The aircraft cell may e.g. be the aircraft cell of a rescue helicopter or of a different aircraft.

The interior trim parts 2, 6 cover opposing side sections of the aircraft cell (not illustrated), while the interior trim parts 4, 5 are designed for the ceiling section. The interior trim part 3 is a cross member extending transversely to the longitudinal direction. The number and shape of interior trim parts are not limited and can be adjusted to the type and intended use of the aircraft.

Figure 1:
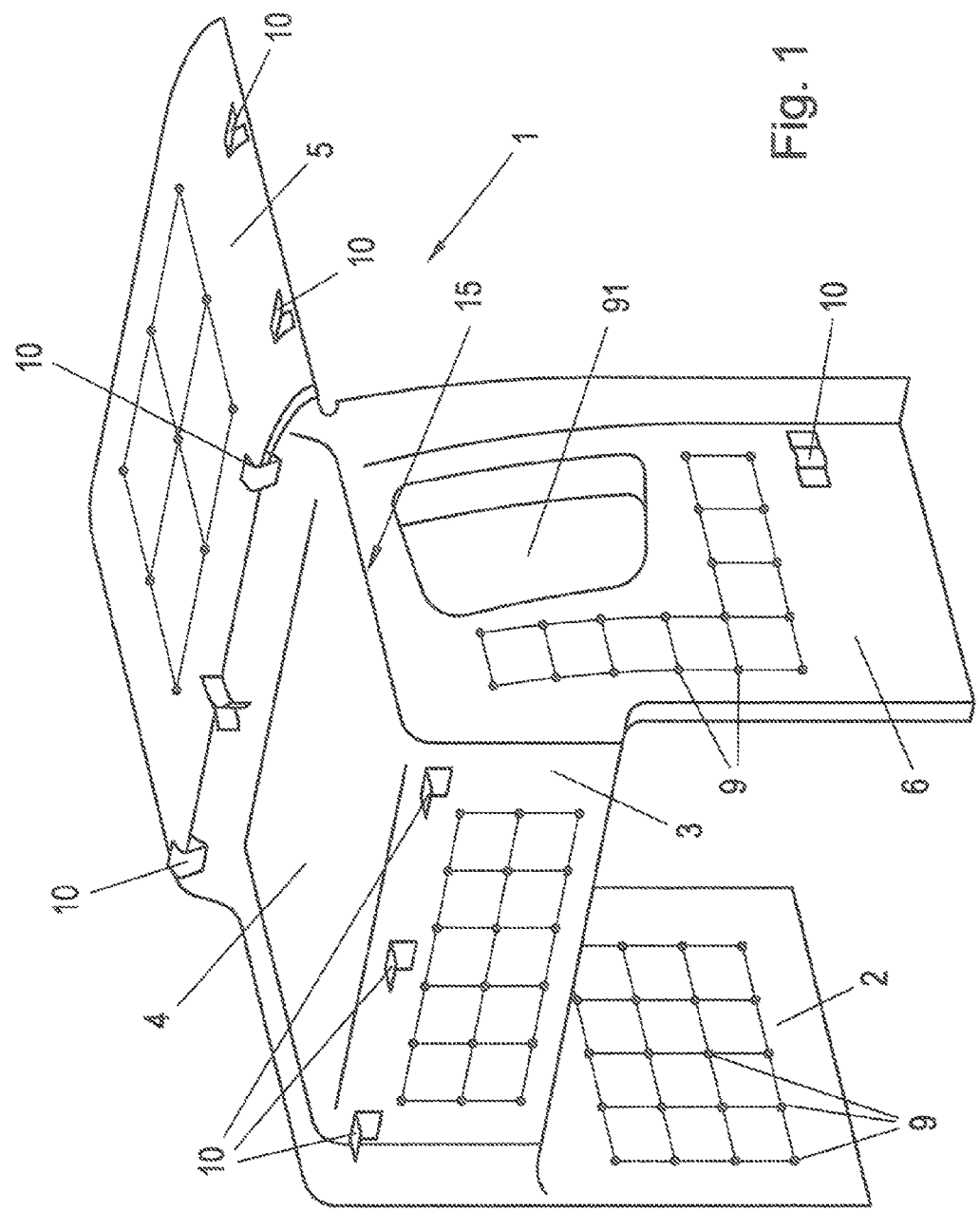
Figure 2:
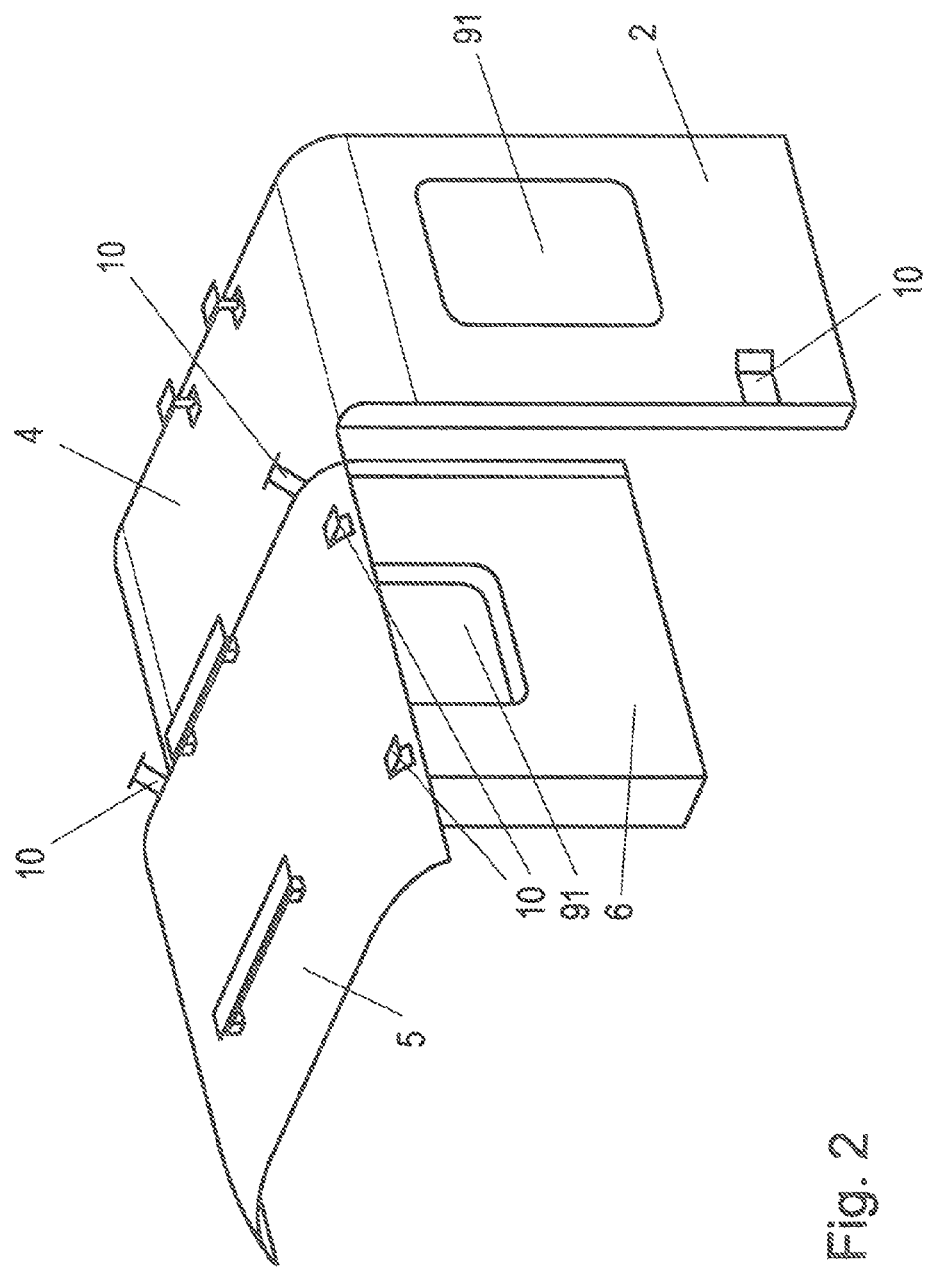

The interior trim parts 2, 3, 4, 5, 6 are thus described in the FIGS. 1 to 3 by way of example only and may be altered according to the design of the aircraft so that the shape of the interior trim parts 2, 3, 4, 5, 6 may be varied as desired within the scope of the invention.

In the sections facing the body of the aircraft, the interior trim parts 2, 3, 4, 5, 6 have fixing brackets 10 for connection to and force transmission into the aircraft cell. The respective force transmission points in the aircraft structure are specified by the aircraft manufacturer or must be formed accordingly. During the mounting of the interior trim parts 2, 3, 4, 5, 6, these will be threadably connected to the aircraft cell by means of the fixing brackets or connected thereto in another suitable way.

According to the invention, the interior trim parts 2, 3, 4, 5, 6 have a support structure, wherein one or more holding positions 9 are provided, which are designed to receive a load on the interior side.

The support structure of the load-bearing interior trim parts 2, 3, 4, 5, 6 is formed by the internal structure of the interior trim parts 2, 3, 4, 5, 6 and may be implemented by various means as known to one skilled in the art, e.g. by the choice of material, wall thickness, profile design etc.

In addition, the interior trim parts 2, 3, 4, 5, 6 may have reinforcements or ribbings to increase rigidity.

In this way, the interior trim parts may be reinforced with a carbon fiber fabric having a tensile strength of approx. 900 MPa; using glass fibers, approx. 600 MPa may be achieved.

In a quasi-isotropic design, a Young's modulus of 40 GPa may be assumed for carbon fiber, while it is approx. 10 GPa for glass fiber.

The given exemplary values strongly depend on the fiber used but are much higher than in conventional interior trim part materials.

The holding positions 9 connected to the support structure of the interior trim part allow it to receive loads acting on the holding positions 9. These loads are e.g. medical devices, screens, tools etc., which may be suspended from these holding positions 9 during operation.

As shown in FIG. 1, the holding positions 9, which are illustrated as points in FIG. 1, may be prefabricated and may not be visible from the outside, so that they may be selected as desired and are integrated into the interior trim part. For this purpose, the holding positions 9 are provided beneath the surface of the interior trim parts 2, 3, 4, 5, 6 and may become operational by breaking the respective surface section. Only by means of this process will they become visible.

Figure 5:
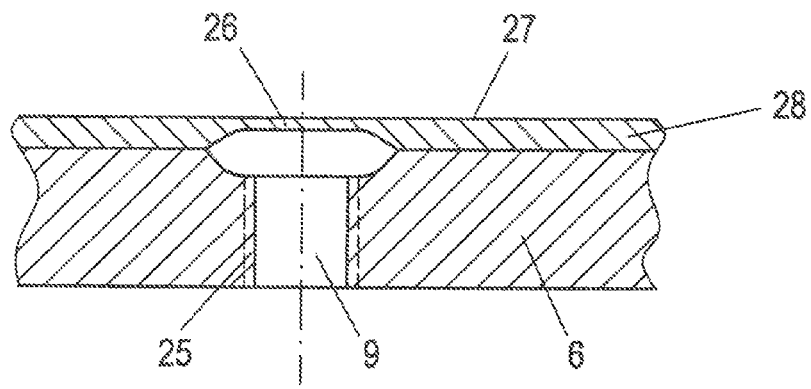
FIG. 5 shows a cross-section of a detail of an interior trim part according to FIG. 1.

One variant of such a holding position 9 is shown in detail in FIG. 5. At this position, the interior trim part 6 has two layers 27, 28 connected to one another, with layer 27 having a breakable thinned wall portion 26, underneath which a cavity including a screw thread 25 is formed so that when the thinned wall portion is broken, the underlying threaded hole is exposed, into which a threaded bolt (not illustrated) may be screwed from the outside for suspension purposes. The threaded hole is embedded into the wall 28 so that the forces transmitted from the outside via the threaded bolt are distributed across the support structure of the interior trim part 6 and subsequently across the aircraft cell.

In this way, the holding positions 9 are formed by threaded inserts, which are integrated into the interior trim parts 2, 3, 4, 5, 6, with the threaded inserts being designed to receive holding devices.

Where the holding positions 9 are disposed in a grid-like arrangement as shown in FIG. 1, this allows for a variable attachment of equipment devices, especially medical ones.

As can be seen e.g. in FIGS. 1, 2 and 3, the peripheral sections of the interior trim parts 2, 3, 4, 5, 6 are shaped and aligned to one another and provided with suitable connection elements 15 such as to be form-locked and force-locked to one another in the assembled state.

By force-locking the interior trim parts 2, 3, 4, 5, 6, composite action is achieved, whereby the assembled set of parts is provided with an increased load-bearing capacity.

For this reason, in the connected state (FIG. 1) the interior trim parts 2, 4, 6 form a U-shaped or arch-shaped cross section, with the upper peripheral sections of the interior trim parts 2 and 6 being respectively force-locked to opposing end cross-sections of the interior trim part 4. Furthermore, by connecting the interior trim part 3 to the side sections of the interior trim parts 2, 4, 6, the rigidity of the set of parts is increased even further.

Figure 4:
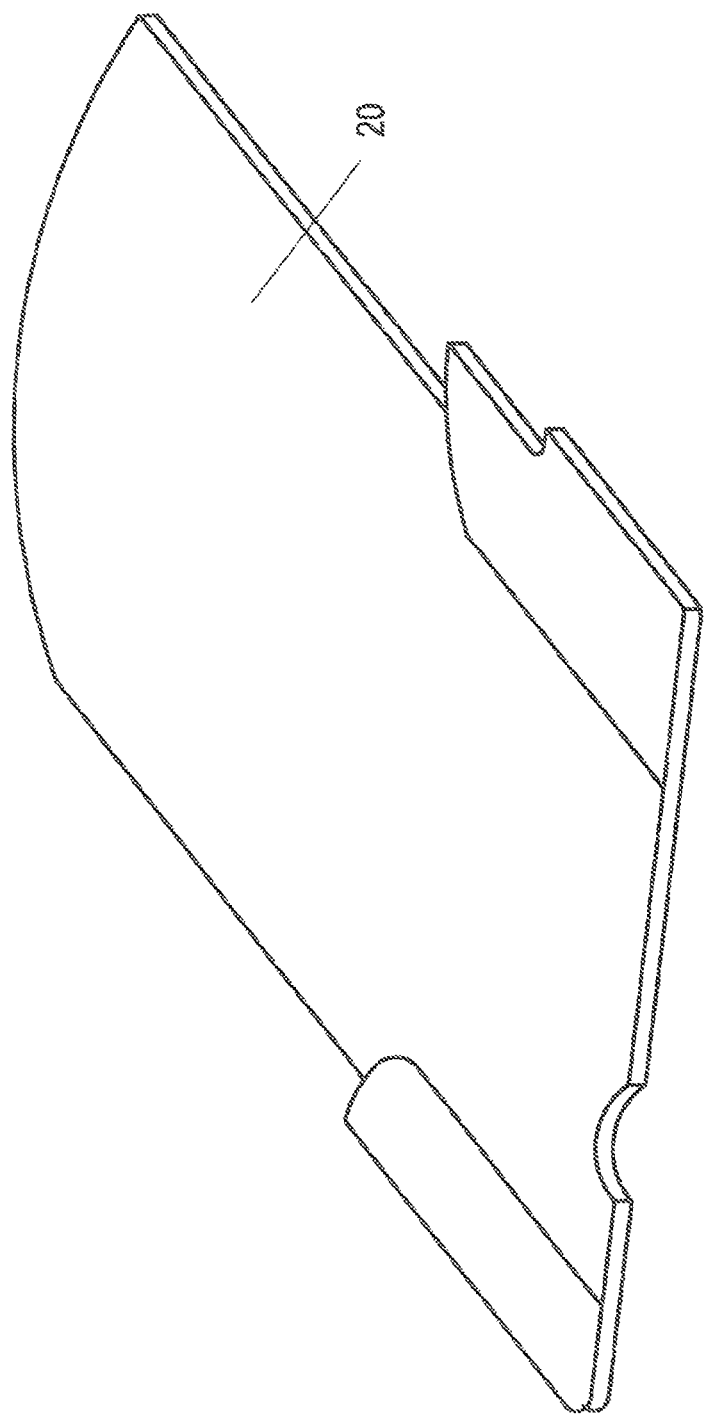
FIG. 4 shows a perspective view of a floor plate.

Due to the composite action thus achieved, it is not necessary to provide additional rigidity by means of a floor plate, so that a floor plate 20 (FIG. 4) having a low wall thickness and thus low dead weight and not being force-locked to the interior trim parts 2, 3, 4, 5, 6 is attached in the floor section of the aircraft cell. The floor plate includes holders, e.g. for a stretcher.

Figure 6:
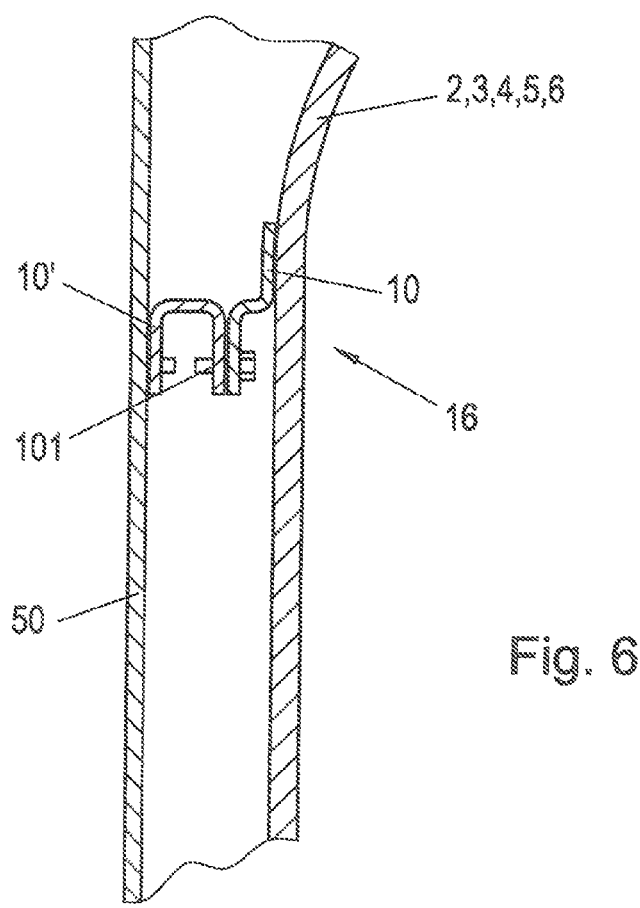
FIG. 6 shows a cross-section of a connection point between an interior trim part according to the invention and an aircraft cell wall.

FIG. 6 shows, by way of example, a force transmission point 16 from an interior trim part 2, 3, 4, 5, 6 into a wall 50 of the aircraft cell, which is implemented by means of the fixing bracket 10 attached to the interior trim part 2, 3, 4, 5, 6 and a fixing bracket 10' attached to the wall 50, which are connected to each other by e.g. a screw connection 101. Such or similar force transmission points are provided at several positions to connect the interior trim parts 2, 3, 4, 5, 6 according to the invention or the set of parts according to the invention to the aircraft cell in such a way that the loads acting on the interior trim parts are absorbed by the latter.

Figure 7:
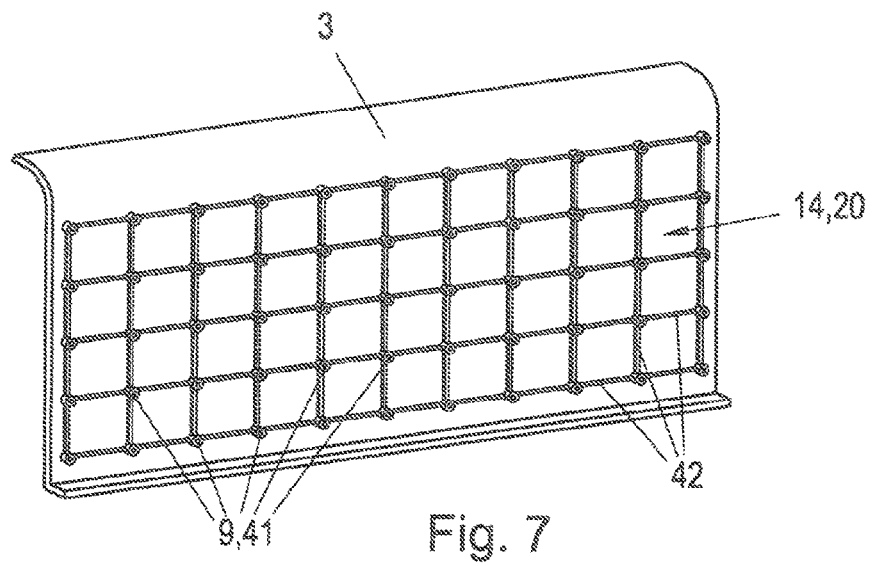
FIG. 7 shows a three-dimensional view of a further embodiment of the interior trim part according to the invention.

Using the interior trim part 3 as an example, FIG. 7 shows an embodiment of the interior support structure 14 as visible. The support structure 14 is formed by an embedded lattice 20 with lattice nodes 41 and lattice ridges 42, wherein the holding positions 9 are formed at the lattice nodes 41.

Figure 8:
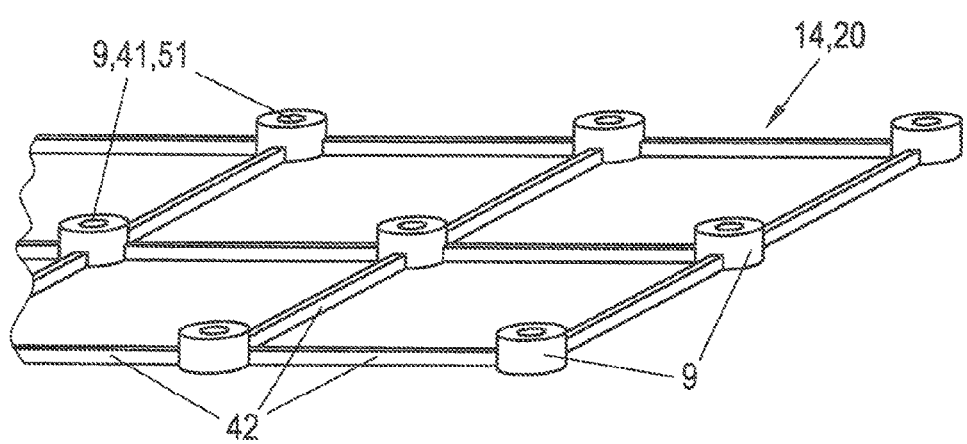
FIG. 8 is an enlarged three-dimensional partial view of the lattice embedded in the interior trim part according to FIG. 7.
Figure 9:
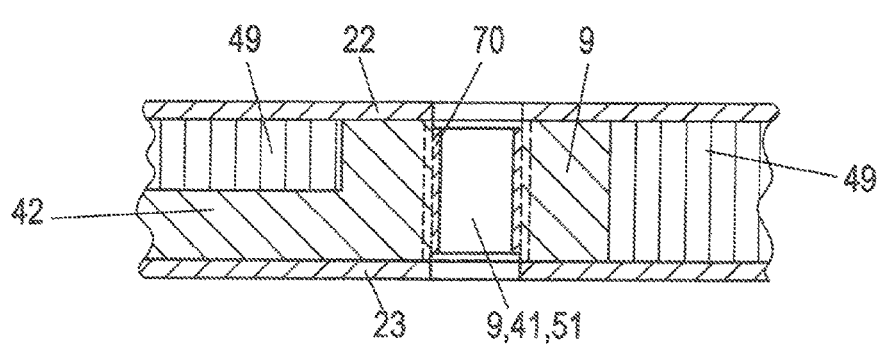
FIG. 9 shows an enlarged partial section of one of the holding positions of the interior trim part of FIG. 7.

The lattice 20, which is made up of the lattice nodes 41 and the lattice ridges 42, is preferably formed from a carbon fiber material and may have square lattice cells as shown in FIGS. 7 and 8, but may have any other lattice structure like triangular, hexagonal lattice cells etc. By the same token, the choice of material to form the lattice may vary within the scope of the invention. As shown in FIG. 7, the lattice extends over the entire plane section of the interior trim part 3, so that a sufficient number of holding positions 9 can be provided. However, a different arrangement or distribution of holding positions 9 is also within the scope of the invention.

In the exemplary embodiment shown, the lattice nodes 41 are formed by preferably cylindrical receiving members 51 having central bores into which threaded inserts may be introduced. The lattice node distance is e.g. 100 nm. In the installed state, the bores of the receiving members 51 are arranged such as to be covered by the interior trim part 3, wherein the lattice 20 is embedded in a honeycomb material 49 of aramid fibers and phenolic resin, e.g. honeycomb material, and is accommodated between cover layers 22, 23, with the underlying lattice nodes 41 being marked on the interior side of the interior trim part 3.

In the curved upper part of the interior trim part 3 (FIG. 7), in which no holding positions 9 are arranged, the cover layers 22, 23 meet and are laminated together.

Figure 10:
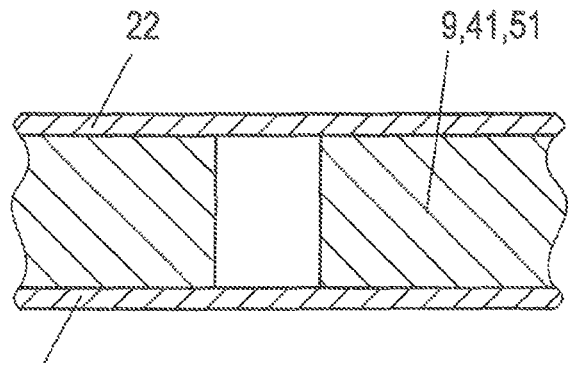
FIGS. 10 to 12 show enlarged partial sections of the holding positions according to FIG. 9 during the insertion of a threaded insert.
Figure 11:
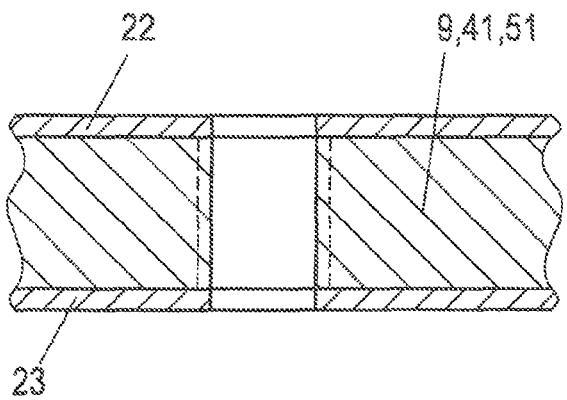
Figure 12:
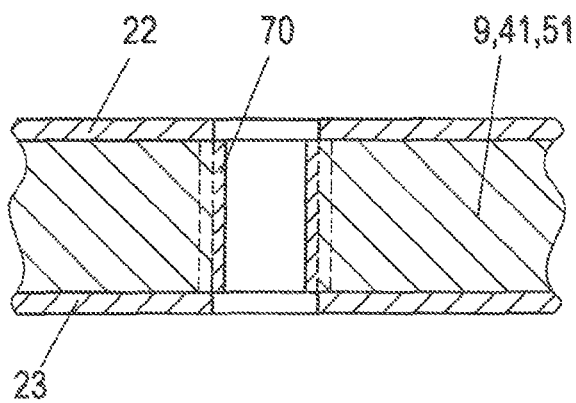
Figures 13, 14:
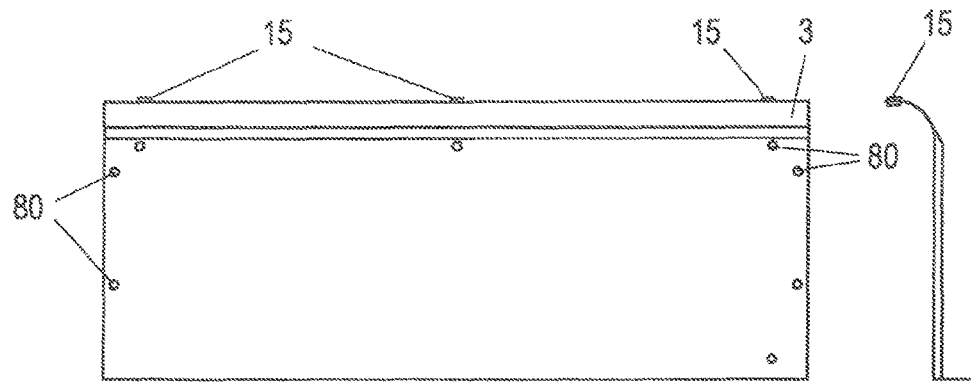
FIGS. 13, 14 and 15 show a front, a side and a top view of an embodiment of the interior trim part according to the invention.
Figure 15:
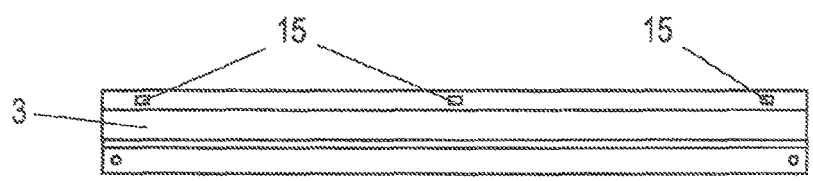
Figures 16, 17:
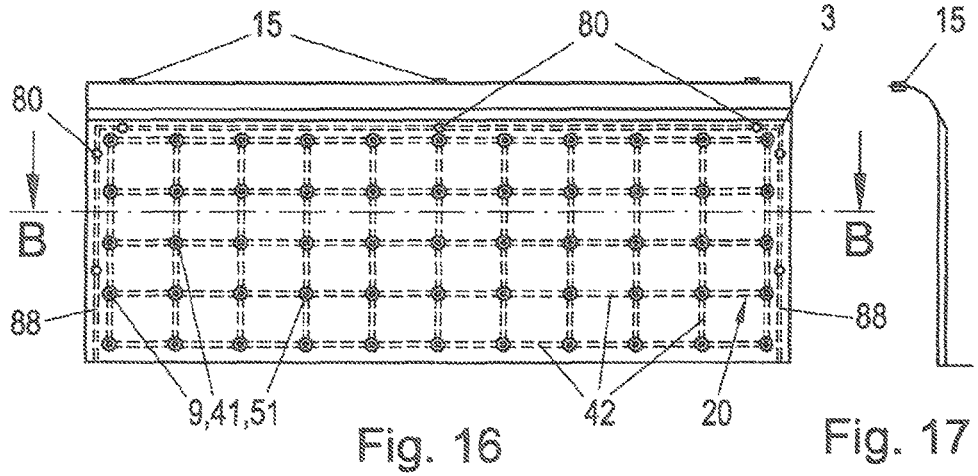
FIGS. 16, 17 and 18 show a front and a side view as well as a section BB of the interior trim part according to FIG. 13 with an illustration of the inserted lattice.
Figure 18:
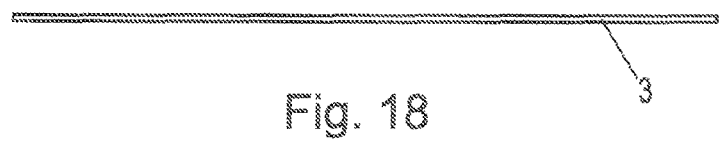

In FIG. 10 a schematic view of the holding position 9 is shown, which is accommodated between the cover layers 22, 23 after manufacturing of the interior trim part 3 and is not visible. The receiving member 51 has a central bore. By means of the markings provided on the interior-side cover layer 22, the bore provided is then drilled open from the outside at a desired position, and a thread is cut into it (FIG. 11). Finally, a threaded insert 70 is inserted, which may then function as a holding position 9, which is accessible from the interior of the aircraft cell and from which loads may be suspended (FIG. 12).

Furthermore, according to FIGS. 13 to 18, to connect the interior trim part 3 to the aircraft cell, attachment inserts 80 are provided which are embedded into the interior trim part 3, preferably laminated therewithin and preferably formed from stainless steel, and which are force-locked to the grid 20, preferably to the grid nodes 41, by means of ridges 88 to distribute the loads acting on the holding positions 9 to the aircraft body.

Figure 20:
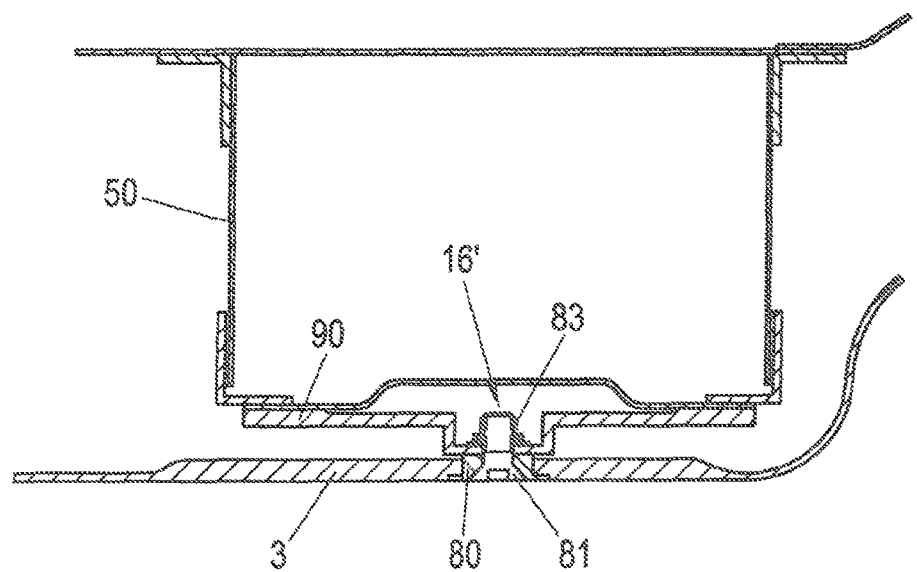
FIG. 20 shows a schematic partial section of the interior trim part according to FIG. 13, which is connected to an aircraft cell.

FIG. 20 shows one embodiment of one of the attachment inserts 80 having a through hole, which extends from the inner side to the outer side of the interior trim part 3 and through which an attachment screw 81 is passed by means of which a force-locked connection is established with the aircraft cell 50 using an exterior female screw 83 to which an attachment socket 90 is attached, thereby forming a force transmission point 16'.

Figure 19:
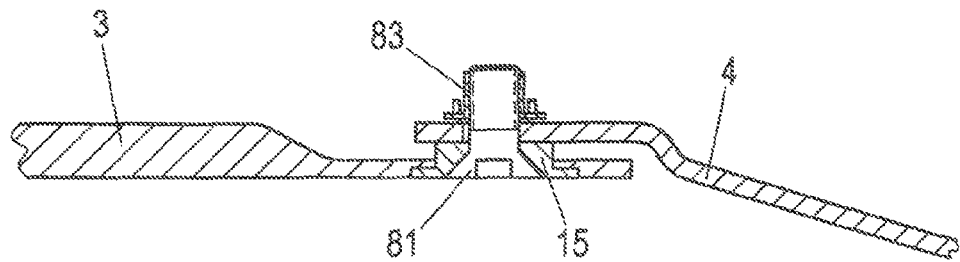
FIG. 19 shows a schematic peripheral cross-section of part of the interior trim part according to FIG. 13 and part of another interior trim part connected thereto.

Furthermore, the interior trim part 3 has connection points 15 on the peripheral side, on which it may be force-locked to another interior trim part 4, e.g. via a screw-female screw connection as shown in FIG. 19.

FIGS. 21 to 24 show the steps for manufacturing the interior trim part 3 according to the invention according to an embodiment of the invention, wherein prepreg elements are used.

Figure 21:
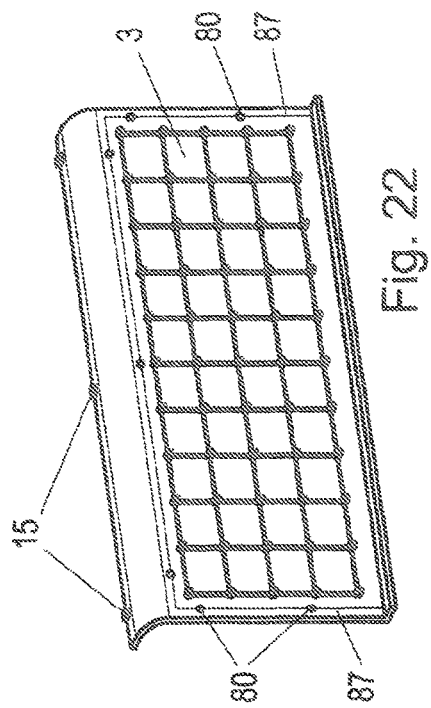
FIGS. 21 to 24 show diagonal views of the steps required in the manufacturing of the interior trim part according to FIG. 13.

FIG. 21: Shaping and impregnating the interior-side cover layer 22 with connection points 15 and holes 80' for the attachment inserts 80 and curing thereof in the autoclave.

Figure 22:
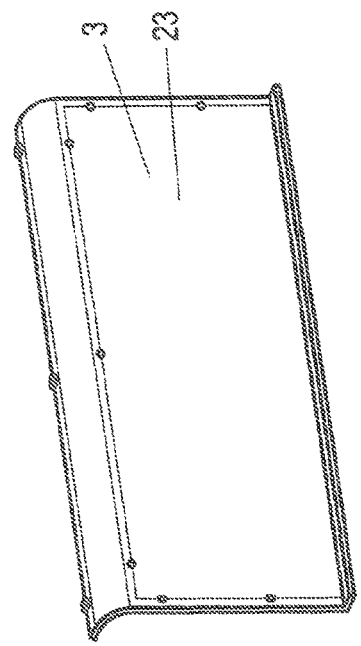

FIG. 22: Assembling the lattice 20 from carbon fiber parts by gluing and placing them on the cured cover layer 22. Placement of lateral carbon fiber frame parts 87 to form the edge finish.

Figure 23:
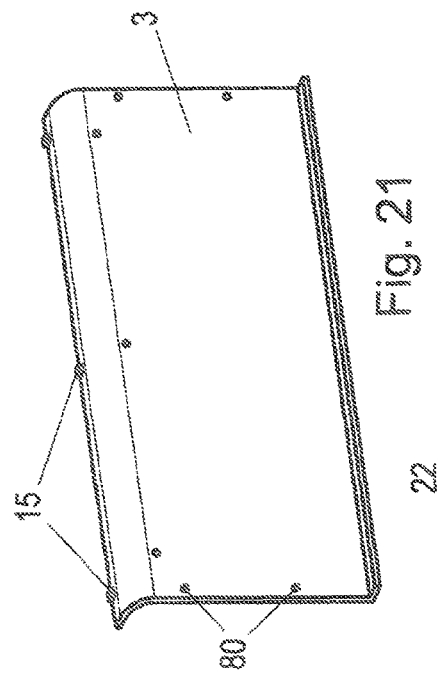

FIG. 23: Placing pre-impregnated honeycomb elements into the gaps of the lattice 20.

Figure 24:
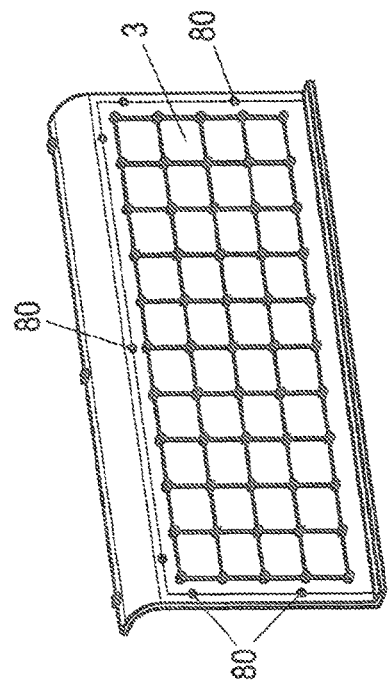

FIG. 24: Placing the exterior cover layer 23 on top and curing it in the autoclave.

REFERENCE NUMBERS

1 set of prefabricated parts
2,3,4,5,6 interior trim part 9 holding positions
10, 10' fixing bracket
14 support structure
15 connection points
16, 16' force transmission points
20 lattice
25 screw thread
26 breakable thinned wall portion
27, 28 layers
41 lattice nodes
42 lattice ridges
49 honeycomb-shaped material
50 aircraft cell
51 cylindrical receiving members
70 threaded inserts
80 attachment inserts
81 screw
83 female screw
87 lateral frame parts
88 ridges
90 socket
91 through holes

We claim:

1. An interior trim part for planar installation with similar interior trim parts for producing a wall covering inside an aircraft cell, wherein the interior trim part may be rigidly connected to the aircraft cell, with the interior trim part having a lattice-shaped support structure with lattice nodes and lattice ridges, wherein at least one holding position designed to receive loads on the interior side is provided, wherein the lattice-shaped support structure is formed by a lattice and that the holding positions are formed at the lattice nodes so that the interior trim part has a plurality of selectable holding positions in a grid-like arrangement to allow for a variable attachment of equipment devices, especially medical ones, on the interior side, wherein the lattice is embedded in the interior trim part so that the interior trim part has the plurality of selectable holding positions beneath the surface and that the holding positions of the lattice nodes are formed by cylindrical receiving members having bores into which threaded inserts may be inserted.

2. The interior trim part of claim 1, wherein the lattice, the lattice nodes and the lattice ridges are formed from a carbon fiber material.

3. The interior trim part of claim 1, wherein the interior trim part comprises a honeycomb-shaped material of aramid fibers and phenolic resin, in which the lattice is embedded and which is accommodated between cover layers, and that the holding positions are covered by the cover layers and insert position markings on the interior-side cover layer mark the underlying lattice nodes.

4. The interior trim part of claim 2, wherein the interior trim part comprises a honeycomb-shaped material of aramid fibers and phenolic resin, in which the lattice is embedded and which is accommodated between cover layers, and that the holding positions are covered by the cover layers and insert position markings on the interior-side cover layer mark the underlying lattice nodes.

5. The interior trim part of one of the claim 1, wherein attachment inserts are provided which are embedded in the interior trim part and force-locked to the embedded lattice.

6. The interior trim part of one of the claim 2, wherein attachment inserts are provided which are embedded in the interior trim part and force-locked to the embedded lattice.

7. The interior trim part of one of the claim 3, wherein attachment inserts are provided which are embedded in the interior trim part and force-locked to the embedded lattice.

8. The interior trim part of claim 5, wherein the attachment insert has a through hole which extends from the inner side to the outer side of the interior trim part and through which an attachment screw may be inserted, by means of which a force-locked connection may be established to the aircraft cell, e.g. by means of an attachment socket attached thereto, or to another interior trim part.

9. The interior trim part of claim 5, wherein every attachment insert is connected to the lattice, preferably to one of the lattice nodes, by means of a ridge.

10. The interior trim part of claim 8, wherein every attachment insert is connected to the lattice, preferably to one of the lattice nodes, by means of a ridge.

11. A set of prefabricated parts having one or more interior trim parts of claim 1, wherein the interior trim parts have connection points on the peripheral side, at which they may be force-locked to one another.

12. The set of prefabricated parts of claim 11, wherein the interior trim parts have at least two side parts and one ceiling part, which are connectable to form a U-shaped cross section.

13. The set of prefabricated parts of claim 11, wherein a floor plate of reduced wall thickness, which is not in a force-locked connection with the interior trim parts, is attached in the floor section of the aircraft cell.

14. The set of prefabricated parts of claim 12, wherein a floor plate of reduced wall thickness, which is not in a force-locked connection with the interior trim parts, is attached in the floor section of the aircraft cell.

15. The set of prefabricated parts of claim 13, wherein the floor plate has holders, e.g. for a stretcher.

16. The set of prefabricated parts of claim 11, wherein the interior trim parts have fixing brackets for attachment to and force transmission into the aircraft cell.

17. The set of prefabricated parts of claim 12, wherein the interior trim parts have fixing brackets for attachment to and force transmission into the aircraft cell.

18. The set of prefabricated parts of claim 13, wherein the interior trim parts have fixing brackets for attachment to and force transmission into the aircraft cell.

19. An aircraft having one or more interior trim parts attached in the aircraft cell or a set of prefabricated parts of claim 11.

20. The aircraft of claim 19, wherein the aircraft is a helicopter or an airplane.

* * * * *